United States Patent [19]
Collette et al.

[11] Patent Number: 5,628,957
[45] Date of Patent: May 13, 1997

[54] METHOD OF FORMING MULTILAYER CONTAINER WITH POLYETHYLENE NAPHTHALALTE (PEN)

[75] Inventors: Wayne N. Collette; Steven L. Schmidt, both of Merrimack; Suppayan M. Krishnakumar, Nasua, all of N.H.

[73] Assignee: Continental PET Technologies, Inc., Florence, Ky.

[21] Appl. No.: 349,173

[22] Filed: Dec. 5, 1994

Related U.S. Application Data

[63] Continuation-in-part of Ser. No. 165,571, Dec. 15, 1993, abandoned, which is a continuation-in-part of Ser. No. 82,171, Jun. 30, 1993, abandoned, which is a continuation-in-part of Ser. No. 909,961, Jul. 7, 1992, abandoned.

[51] Int. Cl.$^6$ ................................................. B29C 49/22
[52] U.S. Cl. .................... 264/512; 264/513; 428/35.7; 428/36.91
[58] Field of Search ............................ 264/512, 513, 264/515; 428/35.7, 36.7, 36.91, 36.6

[56] References Cited

U.S. PATENT DOCUMENTS

| | | | |
|---|---|---|---|
| 5,035,931 | 7/1991 | Yamada et al. | 428/35.7 |
| 5,066,613 | 11/1991 | Shepherd et al. | 525/444 |
| 5,213,856 | 5/1993 | Po et al. | 428/35.7 |
| 5,221,507 | 6/1993 | Beck et al. | 264/513 |
| 5,352,401 | 10/1994 | Dalgewicz, III et al. | 428/35.7 |
| 5,443,766 | 8/1995 | Slat et al. | 264/513 |

FOREIGN PATENT DOCUMENTS

| | | |
|---|---|---|
| 0368278 | 5/1990 | European Pat. Off. |
| 394751 | 10/1990 | European Pat. Off. |
| 61-279553 | 12/1986 | Japan. |
| 1-085732 | 3/1989 | Japan. |
| 3-039250 | 2/1991 | Japan. |
| 3-133640 | 6/1991 | Japan. |
| 4-064440 | 2/1992 | Japan. |
| 4-039024 | 2/1992 | Japan. |
| 4-039025 | 2/1992 | Japan. |
| 4-148929 | 5/1992 | Japan. |
| 4-197634 | 7/1992 | Japan. |
| 4-239640 | 8/1992 | Japan. |
| 5-116207 | 5/1993 | Japan. |
| 5-212834 | 8/1993 | Japan. |
| 5-330535 | 12/1993 | Japan. |

OTHER PUBLICATIONS

Research Disclosure, vol. 294, No. 29410, Oct. 1988, New York, NY, USA, pp. 714–719, XP 000068665, Disclosed Anonymously, "Poly(Ethylene Naphtalenedicarboxylate-)Poly(Ethylene Terephtalate) Blends".

*Primary Examiner*—Catherine Timm
*Attorney, Agent, or Firm*—Wolf, Greenfield & Sacks, P.C.

[57] ABSTRACT

A multilayer preform and container, and method of forming the same, having at least one layer including polyethylene naphthalate (PEN) to provide enhanced oxygen barrier performance and thermal stability. The PEN layer may be a homopolymer, copolymer, or blend of PEN. In a first high-PEN embodiment, the exterior layer contains on the order of 80–100% PEN and 0–20% PET by total weight of the layer, and a core layer of a non-strain hardenable polyester such as PETG. In a second low-PEN embodiment, the exterior layer includes a strain hardenable low-PEN copolymer or blend including on the order of 1–20% PEN and 80–99% PET, and the core layer is a strain-hardenable polyester such as a low-copolymer PET. In a third mid-range PEN embodiment, the exterior wall includes a substantially amorphous PEN copolymer or blend containing on the order of 20–80% PEN and 80–20% of another polyester such as PET, and a strain-hardened core layer of polyester such as a low-copolymer PET. To further enhance the oxygen barrier and thermal stability properties, the core layer may further include a copolymer or blend of PEN. Alternatively, PEN may be provided in an interior layer only.

40 Claims, 3 Drawing Sheets

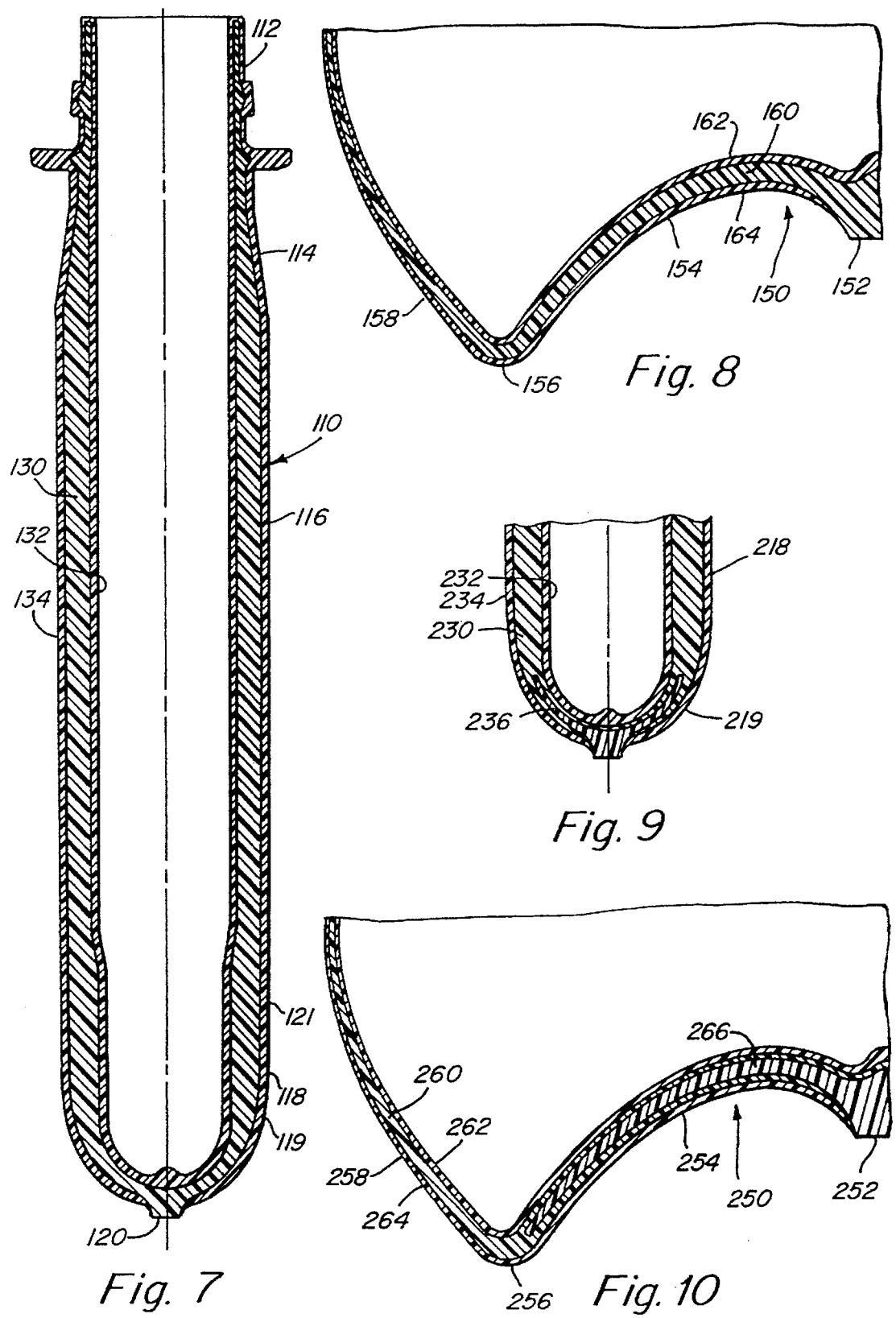

METHOD OF FORMING MULTILAYER CONTAINER WITH POLYETHYLENE NAPHTHALALTE (PEN)

RELATED APPLICATIONS

This is a continuation-in-part of and commonly owned U.S. Ser. No. 08/165,571 filed Dec. 15, 1993 entitled MULTILAYER PREFORM AND CONTAINER WITH POLYETHYLENE NAPHTHALATE (PEN), AND METHOD OF FORMING SAME, abandoned which is a continuation-in-part of and commonly owned U.S. Ser. No. 08/082,171 entitled METHOD OF FORMING MULTILAYER PREFORM AND CONTAINER WITH LOW-CRYSTALLIZING INTERIOR LAYER, filed Jun. 30, 1993, abandoned which is a continuation-in-part of and commonly owned U.S. Ser. No. 07/909,961 entitled MULTILAYER REFILLABLE CONTAINER, PREFORM AND METHOD OF FORMING THE SAME, filed Jul. 7, 1992, abandoned all by W. Collette, S. Schmidt and S. Krishnakumar.

FIELD OF THE INVENTION

This invention relates to improvements in blow-molded plastic containers, and more particularly to preforms and containers having multilayer transparent sidewalls including a homopolymer blend or copolymer of polyethylene naphthalate (PEN) for enhanced thermal and barrier properties, and one or more additional layers able to withstand the high orientation temperature and planar stretch ratios of PEN while maintaining container transparency. The container is particularly useful as a refillable and/or hot-fillable beverage container.

BACKGROUND OF THE INVENTION

The market for polyethylene terephthalate (PET) refillable carbonated soft drink (CSD) bottles has enjoyed significant growth worldwide, since its introduction in 1987 by Continental PET Technologies. These bottles have been commercialized throughout much of Europe, Central and South America, and are now moving into the Far East market.

Refillable bottles reduce the existing landfill and recycle problems associated with disposable plastic beverage bottles. In addition, a refillable bottle provides a safer, lighter-weight plastic container in those markets, currently dominated by glass, where legislation prohibits use of non-returnable packages. The goal is to produce a refillable bottle having the necessary physical characteristics to withstand numerous refill cycles, while being economical to produce.

Generally, a refillable plastic bottle must maintain its functional and aesthetic characteristics over a minimum of 10 and preferably 20 cycles or loops to be economically feasible. A cycle (illustrated in FIG. 3) is generally comprised of (1) an empty hot caustic wash, (2) contaminant inspection (before and/or after wash) and product filling/capping, (3) warehouse storage, (4) distribution to wholesale and retail. locations and (5) purchase, use and empty storage by the consumer, followed by eventual return to the bottler.

Refillable containers must fulfill several key performance criteria in order to achieve commercial viability, including:

1. high clarity (transparency) to permit visual on-line inspection;
2. dimensional stability over the life of the container; and
3. resistance to caustic wash induced stress cracking and leakage.

A commercially successful PET refillable CSD container is presently being distributed by The Coca-Cola Company in Europe (hereinafter "the prior art CSD container"). This container is formed of a single layer of a polyethylene terephthalate (PET) copolymer, with 3–5% comonomer such as 1,4-cyclohexanedimethanol (CHDMZ) or isophthalic acid (IPA). The preform, from which this bottle is stretch blow molded, has a sidewall thickness on the order of 5–7 mm, or about 2–2.5 times that of a preform for a disposable one-way bottle. This provides a greater average bottle sidewall thickness (i.e., 0.5–0.7 mm) required for abuse resistance and dimensional stability, based on a planar stretch ratio of about 10:1. The average crystallinity in the panel (cylindrical sidewall section beneath the label) is about 15–20%. The high copolymer content prevents visual crystallization, i.e., haze, from forming in the preform during injection molding. Preform haze is undesirable because it produces bottle haze which hinders the visual on-line inspection required of commercial refill containers. Various aspects of this prior art container are described in Continental PET Technology's U.S. Pat. Nos. 4,725,464, 4,755,404, 5,066,528 and 5,198,248.

The prior art CSD container has a demonstrated field viability in excess of 20 refill trips at caustic wash temperatures of up to 60° C. Although successful, there exists a commercial need for an improved container that permits an increase in wash temperature of greater than 60° C., along with a reduction in product flavor carryover. The latter occurs when flavor ingredients from a first product (e.g., root beer) migrate into the bottle sidewall and subsequently permeate into a second product (e.g., club soda) on a later fill cycle, thus influencing the taste of the second product. An increase in wash temperature may also be desirable in order to increase the effectiveness and/or reduce the time of the caustic wash, and may be required with certain food products such as juice or milk.

The above-identified "Related Applications," namely U.S. Ser. Nos. 07/909,961 and 08/082,171, describe an improved refillable container having a higher caustic wash temperature (above 60° C.) and reduced product flavor carryover for a lifetime of 20 refill trips. The improved container is blow molded from a multilayer preform, having an interior layer of a first relatively high copolymer polyester and an exterior layer of a second polyester with relatively less copolymer and a crystallization rate at least 20% higher than the first polyester. The high copolymer prevents crystallization (haze) in the interior core layer during injection blow molding (which core layer cools more slowly), in order to preserve overall container clarity and flexibility. The exterior (inner and outer) layers are made from a homopolymer or low copolymer polyester which has a higher rate of strain-induced crystallization and thus provides enhanced resistance to caustic cracking and reduced flavor carryover at the surface of the blown container. The subject matter of these two applications is hereby incorporated by reference in their entirety.

Polyethylene naphthalate (PEN) is another potential polyester for use in blow-molded containers. PEN has a desirable oxygen barrier capability—about five times that of PET, and a higher heat stability temperature—about 250° F. (120° C.) compared to about 175° F. (80° C.) for PET. These properties would be useful in containers for oxygen-sensitive products (e.g., food or cosmetics) and/or containers subjected to high temperatures (e.g., refill or hot-fill containers). However, PEN is substantially more expensive than PET and has different processing requirements such that PEN has not been successfully used in a commercial blow-molded beverage container.

SUMMARY OF THE INVENTION

A preform and container are provided, and methods of making the same, wherein the preform and container include at least one layer of a first polymer including polyethylene naphthalate (PEN) for enhanced barrier properties and/or thermal resistance. The first polymer is a homopolymer, copolymer, or blend of PEN. The PEN is provided in a multilayer structure in which the other polymer layer (or layers) can be processed, and specifically blow molded, at the temperatures and stretch ratios required for enhancing the physical properties of PEN by strain orientation and crystallization.

The at least one layer of first polymer may be an exterior or an interior layer. Providing PEN at the exterior layer enhances thermal resistance and reduces flavor carryover. However, providing PEN at the interior layer also improves the thermal resistance and avoids contact of the product with PEN if such contact is to be avoided.

In a first high-PEN embodiment, the container sidewall includes inner and outer (exterior) layers of a strain-hardened high-PEN copolymer or blend, containing on the order of 80–100% PEN and 0–20% PET by total weight of the layer, and an interior core layer of a non-strain-hardenable polyester, such as PETG. PETG is a copolymer of polyethylene terephthalate (PET) with on the order 30% cyclohexane dimethanol (CHDM). Alternatively, the core layer may be a blend of PEN/PETG. PEN is provided at the surface (exterior layers) for enhanced performance, including increased resistance to oxygen penetration and good physical properties, i.e., high-impact strength, pressure resistance, stress crack resistance, low product flavor carryover and thermal stability. The PETG layer is substantially non-crystallizable and can be stretched at the orientation temperature and optimum area stretch ratios for the exterior high-PEN layers. In addition, PETG will adhere to the high-PEN layers and will not delaminate in the expanded container. Still further, the core PETG layer provides the necessary wall thickness for overall package stiffness and rigidity, at a reduced cost compared to PEN. By way of specific example, a refillable carbonated beverage container may have a substantially transparent multilayer sidewall with inner and outer layers of on the order of 90% PEN/10% PET by total weight of the layer, and a core layer of PETG, and wherein the relative wall thicknesses of the inner:core:outer layers are on the order of 25:50:25.

At these high-PEN concentrations, PET homopolymer could not be used as the core layer because its orientation temperature is much lower than PEN's orientation temperature—e.g., PEN has a minimum orientation temperature on the order of 260° F. (127° C.), based on a glass transition temperature on the order of 255° F. (123° C.). At these temperatures, PET homopolymer would begin to crystallize and no longer undergo strain hardening (orientation), and the resulting container would be opaque and have insufficient strength. In contrast, PETG is substantially non-crystallizable and can be stretched at the orientation temperature of PEN and at the optimum area stretch ratios for PEN, i.e., on the order of 15–20:1.

In a second low-PEN embodiment, the container sidewall includes inner and outer layers of strain-hardened low-PEN copolymer or blend including on the order of 1–20% PEN and 80–99% PET by total weight of the layer, and an interior core layer of strain-hardened polyester such as PET. At these low levels of PEN, an acceptable match of orientation temperature and stretch ratios can be achieved for the strain-hardened low-PEN inner and outer layers and the strain-hardened core PET layer. In a specific example, a hot-fill container having a transparent sidewall includes inner and outer layers of on the order of 10% PEN/90% PET, and a core layer of low copolymer PET, and wherein the thickness ratio for the inner:core:outer layers is on the order of 30:40:30. The low copolymer PET may have up to on the order of 10% copolymer by total weight of the copolymer, and more preferably on the order of 0–2%. This embodiment provides a good balance between the enhanced physical properties of PEN (at the surface) vs the increased cost and processing requirements of PEN.

In a third mid-PEN embodiment, the container sidewall includes inner and outer layers of substantially amorphous PEN copolymers or blends containing on the order of 20–80% PEN and 80–20% of another polyester such as PET, and a strain-hardened interior core layer of polyester such as PET. In a specific example, a refillable carbonated beverage container may have inner and outer layers of on the order of 50% PEN/50% PET by total weight of the layer, and a core layer of low copolymer PET, and wherein the thickness ratio of the inner:core:outer layers is on the order of 30:40:30. In a second example, a hot-fill container sidewall of the same materials has a thickness ratio of inner:core:outer layers of on the order of 15:70:15. The PET core layer will strain-harden to control material distribution during blow molding.

These and other features of the invention will be more particularly described by the following detailed description and drawings of select embodiments.

BRIEF DESCRIPTION OF THE DRAWINGS

FIG. 7 is an enlarged sectional view of the resulting multilayer preform of this invention;

FIG. 8 is an enlarged fragmentary view showing in cross section the base of a container made from the preform of FIG. 7;

FIG. 9 is a fragmentary sectional view of an alternative preform embodiment, having a third injection of PEN which displaces the second polymer in a central portion of the base-forming section; and FIG. 10 is an enlarged fragmentary view showing in cross section the base of a container made from the preform of FIG. 9.

DETAILED DESCRIPTION

Figure 1:
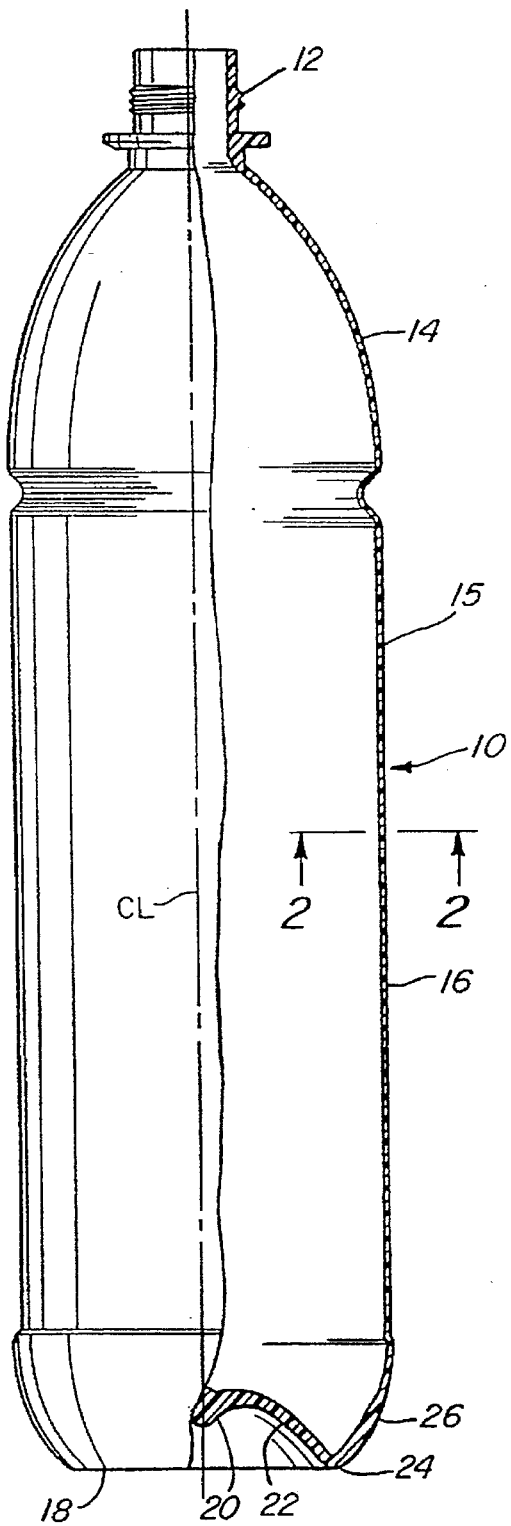
FIG. 1 is a schematic elevational and partially broken-away view of a refillable 1.5 liter carbonated beverage bottle according to one embodiment of this invention.

Referring to the drawings, FIG. 1 shows a 1.5 liter refillable carbonated beverage bottle which comprises one embodiment of the present invention. The bottle 10 is a unitary expanded plastic preform container having a substantially transparent multilayer sidewall, and is made from the multilayer preform of FIG. 7. The container body has an open top end with a small-diameter neck finish 12 with external screw threads for receiving a screw-on cap (not shown), and a closed bottom end or base 18. Between the neck finish 12 and base 18 is a substantially vertically-disposed sidewall 15 (defined by vertical axis or centerline CL of the bottle), including an upper tapered shoulder portion 14 and a substantially cylindrical panel portion 16. The base 18 is a thickened champagne style base with a thickened central gate portion 20 and, moving radially outwardly toward the sidewall, an outwardly concave dome 22, an inwardly concave chime 24, and a radially increasing and arcuate outer base portion 26 for a smooth transition to the sidewall panel 16. The chime 24 is a substantially toroidal-shaped area around a standing ring on which the bottle rests; the chime is relatively thick to resist stress cracking. The dome and chime form a thickened base portion, which is about 3–4× the thickness of the panel 16. Above the chime there is a thinner outer base portion 26 of about 50–70% the thickness of the thickened base portion, and increasing in orientation up to its junction with the sidewall. The thinner outer base portion 26 provides improved impact resistance.

Figure 2:
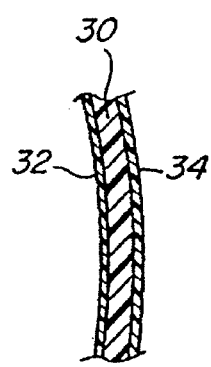
FIG. 2 is an enlarged fragmentary view taken along the section line 2—2 of FIG. 1, showing more specifically exterior (inner and outer) layers of PEN and an interior (core) layer of a second polymer.

The multilayer sidewall of bottle 10 is not specifically illustrated in FIG. 1 due to the small scale of the drawing. However, FIG. 2 shows in cross section the panel portion 16 having exterior (inner and outer) PEN layers 32 and 34, and an interior (core) layer 30 of a second polymer. In this embodiment the second polymer is a substantially noncrystallizable high copolymer PET, known as PETG, or a blend of PETG and PEN. The panel core layer 30 is about 0.0093 inches (0.24 mm) thick and the panel inner and outer layers 32 and 34 are each about 0.0047 inches (0.12 mm) thick. The shoulder 14 and base 18 are stretched less and therefore are thicker and less oriented than the panel 16. The container is about 13.2 inches (335 mm) in height and about 3.6 inches (92 mm) in (widest) diameter.

A preform for making the container of FIG. 1 is shown in FIG. 7. The preform 110 has a panel-forming section 116 with a wall thickness of about 0.280 inches (7 mm), including a preform core layer 130 about 0.140 inches (3.5 mm) thick, and inner and outer layers 132 and 134 each about 0.070 inches (1.8 mm) thick. The container panel 16 is stretched at an average planar stretch ratio of about 15:1. The planar stretch ratio is the ratio of the average thickness of the preform panel-forming portion 116 to the average thickness of the container panel 16, wherein the "average" is taken along the length of the respective preform or container portion. For refillable carbonated beverage bottles of about 0.5 to 2.0 liters/volume and about 0.5 to 0.8 mm in panel wall thickness, a preferred planar stretch ratio is about 12–20:1, and more preferably about 15–20:1. The hoop stretch is preferably about 6–7× and the axial stretch about 3–4×. This produces a container panel with the desired abuse resistance, and a preform sidewall with the desired visual transparency. The specific panel thickness and stretch ratio selected depend on the dimensions of the bottle, the internal pressure (e.g., 2 atm for beer, 4 atm for soft drinks), and the processing characteristics (as determined for example, by the intrinsic viscosity) of the particular materials employed.

Polyethylene naphthalate (PEN), which may form all or part of a particular layer, is a polyester produced when dimethyl 2,6-naphthalene dicarboxylate (NDC) is reacted with ethylene glycol. The PEN polymer comprises repeating units of ethylene 2,6 naphthalate of the formula:

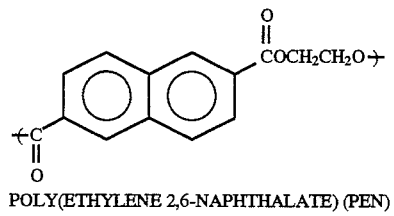

POLY(ETHYLENE 2,6-NAPHTHALATE) (PEN)

PEN resin is available having an inherent viscosity of 0.67 dL/g and a molecular weight of about 20,000 from Amoco Chemical Company, Chicago, Ill. PEN has a glass transition temperature $T_g$ of about 123° C., and a melting temperature $T_m$ of about 267° C.

Polythelene terephthalate (PET), which forms all or part of various layers, is a polyester produced by polymerizing terephthalic acid or its ester-forming derivative with ethylene. The PET homopolymer comprises repeating units of ethylene terephthalate of the formula:

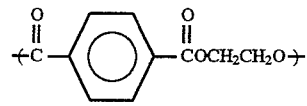

POLY(ETHYLENE TEREPHTHLATE) (PET)

PET homopolymer has a $T_g$ of about 73° C. and a $T_m$ of about 253° C.

In one embodiment, the present invention contemplates the use of high copolymers of PET which are substantially noncrystallizable at the orientation temperature of PEN, e.g., PETG. The high copolymer PETG is PET with about 30% by total weight of the comonomer 1,4 cyclohexane-dimethanol (CHDM). PETG is commercially available from Eastman Chemical in Kingsport, Tenn. as KODAR® PETG Copolyester 6763. The comonomer (e.g., CHDM as a replacement for the glycol moiety) disrupts the PET polymer backbone (i.e., alternating units of acid and gylcol) to decrease the molecular crystallization rate. The comonomer is most effective if it forms part of the backbone, but it may also form a branched copolymer. Another suitable high copolymer PET includes a high level of isophthalic acid (IPA) to render the polymer substantially non-crystallizable and amorphous.

An alternative embodiment contemplates the use of a blend of PEN and PET. For example, a blend of PEN/PETG in a weight ratio of 25:75 can be prepared by melt blending the two polymers. A core layer of PEN/PETG blend in the multilayer would be expected to provide even higher thermal and barrier properties and even greater layer compatibility, than a core of PETG. The similar chemical structure of (and or hydrogen bonding between) PEN, PET, and other polyesters, provides the necessary melt compatibility and layer adhesion. As a further alternative, the PEN can be blended or copolymerized with a homopolymer or low copolymer of PET. A low-level PEN copolymer or blend would have up to on the order of 10% by weight of PEN, and the remainder another polyester, such as PET homopolymer or copolymer. By "PET copolymers" it is meant the commercially available bottle grade PET copolymers with up to on the order of 10% by weight, and typically up to on the order of 5%, of other monomers, i.e., isophthalic acid (IPA), cyclohexane dimethanol (CHDM), or diethylene glycol.

The intrinsic viscosity (I.V.)effects the processability of the polyester resins. Polyethylene terephthalate having an intrinsic viscosity of about 0.8 is widely used in the CSD industry. Resins for various applications may range from about 0.55 to about 1.04, and more particularly from about 0.65 to 0.85. Intrinsic viscosity measurements are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V.=(1n(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The blown container should be substantially transparent. One measure of transparency is the percent haze for transmitted light through the wall ($H_T$) which is given by the following formula:

$$H_T=[Y_d \div (Y_d+Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The refill container of this invention should have a percent haze (through the panel wall) of less than about 10%, and more preferably less than about 5%.

The preform should also be substantially transparent, having a percent haze across the wall of no more than about 10%, and more preferably no more than about 5%.

The container of FIG. 1 will have varying levels of strain-induced crystallinity in the exterior PEN layers at various positions along the height of the bottle from the neck finish to the base, based on the varying stretch ratio is along the bottle. The percent crystallinity may be determined according to ASTM 1505 as follows:

$$\% \text{ crystallinity}=[(ds-da)/(dc-da)] \times 100$$

where ds=sample density in g/cm³, da=density of an amorphous film of zero percent crystallinity, and dc=density of the crystal calculated from unit cell parameters. The panel portion 16 of the container is stretched the greatest and preferably has an average percent crystallinity of at least about 15%, and more preferably at least about 20%. A 15–25% crystallinity range is useful in refill and hot-fill applications.

Further increases in crystallinity can be achieved by heat setting to provide a combination of strain-induced and thermal-induced crystallization. Thermal-induced crystallinity is achieved at low temperatures to preserve transparency, e.g., holding the container in contact with the blow mold. In some applications, a high level of crystallinity at the surface of the sidewall alone is sufficient.

Figure 3:
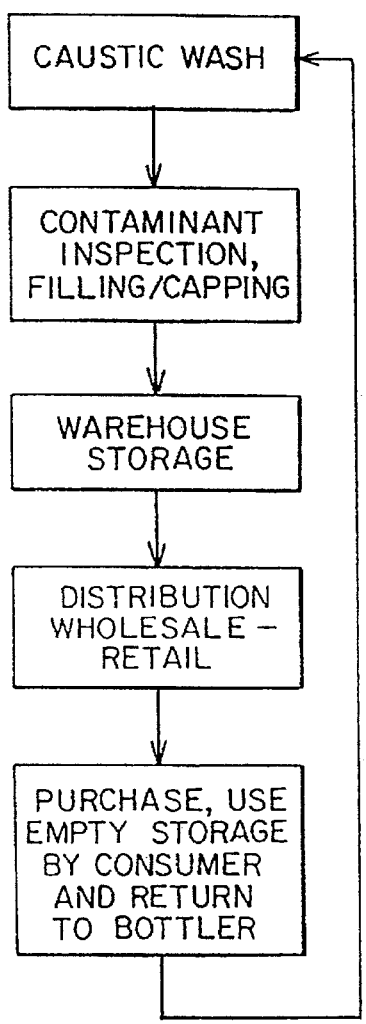
FIG. 3 is a schematic illustration showing a typical cycle or loop through which a refillable container must pass.

FIG. 3 shows a typical refill cycle for a commercial refillable container. A test procedure for simulating such a cycle would be as follows. As used in this specification and claims, the ability to withstand a designated number of refill cycles without crack failure and/or with a maximum volume change is determined according to the following test procedure.

Each container is subjected to a typical commercial caustic wash solution prepared with 3.5% sodium hydroxide by weight and tap water. The wash solution is maintained at a designated wash temperature, e.g., 60° C. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure in a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. Volume change is determined by comparing the volume of liquid the container will hold at room temperature, both before and after each refill cycle.

The refillable container 10 of this invention can preferably withstand at least 20 refill cycles at a wash temperature of 60° C. without failure, and with no more than about 1.5% volume change after 20 cycles. The container also preferably exhibits at least a 20% reduction in product flavor carryover (compared to the prior art CSD bottle) as determined by gas chromatography mass spectrometer measurements.

Figure 4:
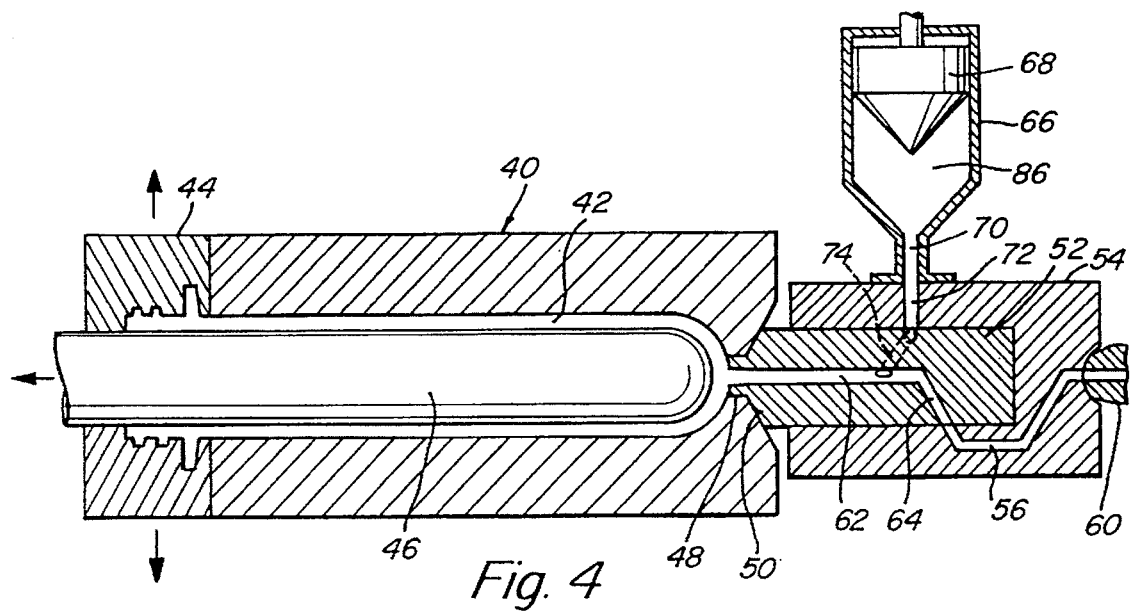
FIG. 4 is a schematic sectional view taken through an injection mold cavity suitable for making a multilayer preform in accordance with this invention.
Figure 5:
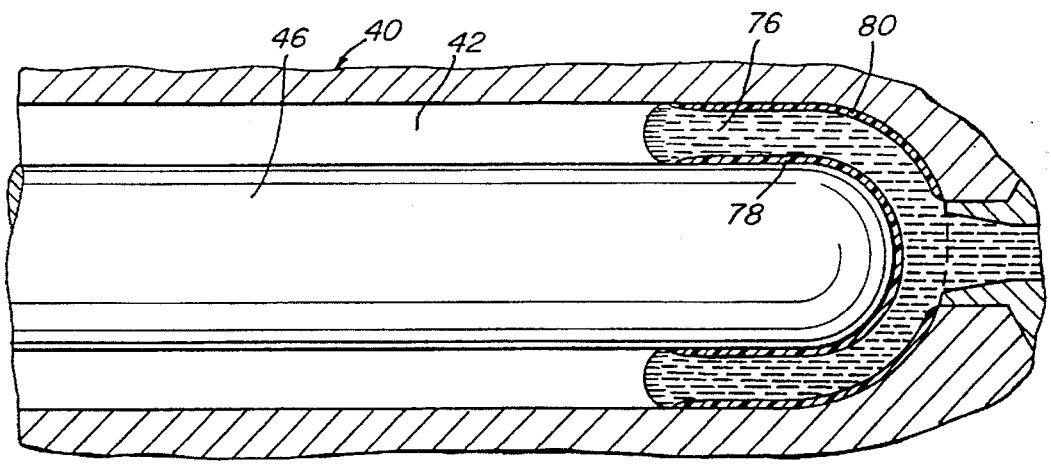
FIG. 5 is an enlarged fragmentary view of the bottom of the mold cavity of FIG. 4, showing a quantity of PEN being injected and the cooling upon contact with the mold wall surfaces to form the exterior (inner and outer) layers of the preform.
Figure 6:
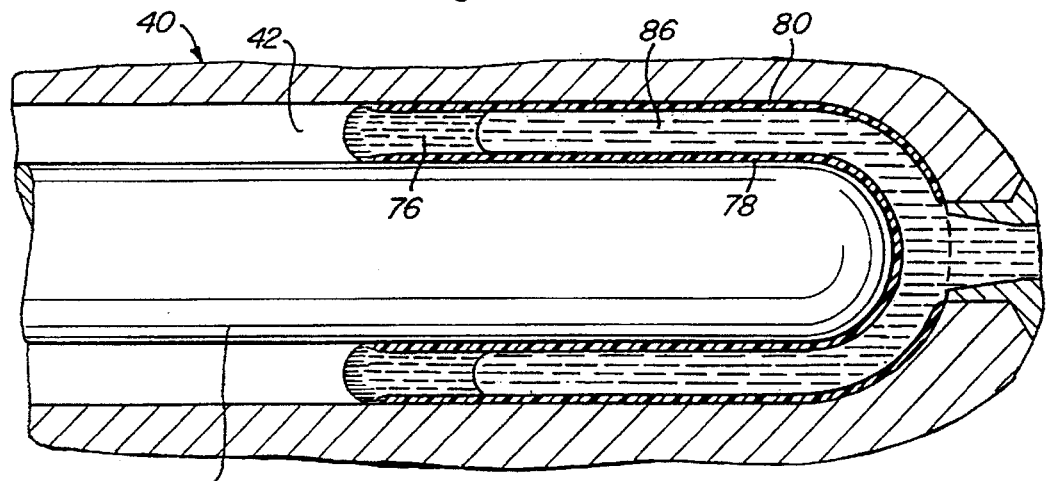
FIG. 6 is an enlarged fragmentary view similar to FIG. 5, showing a quantity of second polymer being injected to form the interior (core) layer and the tunnel flow of both PEN and second polymer to form the multilayer preform.

FIGS. 4–6 illustrate a metered, sequential coinjection apparatus for making a multilayer preform of this invention. This apparatus is substantially described in U.S. Pat. No. 4,710,118 to Krishnakumar et al. granted Dec. 1, 1987, which is hereby incorporated by reference in its entirety.

As shown in FIG. 4, an injection mold unit 40 includes an outer mold cavity 42, a neck ring 44 which defines the neck finish, and a core 46. The neck ring 44 in conjunction with the corze 46 closes the upper end of the mold cavity 42 while the lower end is provided with an opening 48 which receives in sealed relation a nozzle-like end 50 of a rotary valve member 52 of the extruder. The valve member 52 is mounted in sealed relation within a valve block 54 which has formed therein a first passage 56 which receives a conventional nozzle 60 of a plasticizer or injection head. The passage 56 opens radially toward the rotary valve member 52, and the latter has a through passage 62 which at one end terminates in a generally radial passage 64 which can be aligned with the passage 56. There is also associated with the valve block 54 a second material dispenser 66 which includes a dispensing piston 68 and a flow passage 70 exiting therefrom toward the valve block 54. The valve block 54 has a radial passage 72 which is axially aligned with and in communication with the passage 70. The valve member 52 has a further passage 74 extending generally radially from the passage 62 and so circumferentially spaced from the passage 64 such that when the passage 64 is aligned with the passage 56, the passage 74 is spaced from the passage 72. By rotating the valve member 52, the passage 64 may be moved out of communication with the passage 56 and the passage 74 moved into communication with the passage 72. Thus, material may be selectively supplied from either the first supply device (injection head) 60 or from the second supply device 66.

In accordance with this embodiment, the first supply device 60 delivers PEN for the inner and outer layers. The second supply device 66 delivers PETG (or a PEN/PETG blend) for the core layer.

Referring to FIG. 5, it will be seen that a preselected amount of first resin 76 will be injected into the bottom of the mold cavity 42 and as it flows through the mold cavity, due to the relatively cool temperature of the mold unit 40 including the core 46, there will be solidification of the resin 76 to define exterior inner and outer layers 78, 80 of the first material.

As is schematically shown in FIG. 6, the second resin 86 is next injected into the mold cavity. It will be seen that the second resin 86 will have a tunnel flow through the cavity defined between the layers 78, 80 and at the same time will advance the previously injected material 76. The interior core material cools more slowly because it does not contact the cooler mold walls; however, because the core layer is substantially noncrystallizable, it resists hazing.

In FIG. 7 there is shown a preform 110 made as previously described, which includes a PETG core layer 130 and PEN inner and outer layers 132, 134 which are continuous except for a portion of the core material 130 which extends through the outer layer 132 at the gate 120. The preform 110 includes an upper neck finish 112, a tapered shoulder-forming section 114 which increases in thickness from top to bottom, a panel-forming section 116 having a uniform wall thickness, and a base-forming section 118. Base section 118 includes an upper cylindrical thickened portion 121 of greater thickness than the panel section 116 and which forms a thickened chime in the container base, and a tapering lower portion 119 of reduced thickness for forming the recessed dome of the container. A preform having a preferred cross-section for refill applications is described in U.S. Pat. No. 5,066,528 granted Nov. 19, 1991 to Krishnakumar et al., which is hereby incorporated by reference in its entirety. The core layer 130 of the panel section 116 is roughly twice the thickness of each of the inner and outer layers 132 and 134, when forming the preferred 1.5 liter bottle previously described.

The blown container, as shown in FIG. 8, has a champagne-type base section 150 including a center gate portion 152, central recessed dome 154, chime 156, and outer base portion 158. The core layer 160 and inner and outer layers 162 and 164, respectively, vary in thickness along the base depending upon the relative amount of stretch the specific base portion has undergone, but generally the wall thickness decreases progressively while moving radially away from the gate 152.

FIG. 9 shows an alternative embodiment of a preform base-forming section 218, wherein a third resin is injected into at least a central portion 236 of the base-forming section, and preferably into the reduced wall thickness lower base portion 219 which cools more rapidly and is not as susceptible to hazing. Portion 236 displaces the core material 230 and preferably is of the same material as the inner and outer layers 232, 234, so that in the coinjection process previously described the nozzle is cleared of the core resin before the next preform is started to avoid injecting any core resin in the inner and outer layers of the next preform. As shown in FIG. 10, a champagne-type container base 250 blown from the preform of FIG. 9, includes a gate portion 252, dome 254, chime 256, and outer base 258. Across the wall, the base includes inner and outer layers 262 and 264, respectively, and core layer 260. The core layer 260 is displaced at least in part by section 266 across the gate and recess areas.

Other factors important in the manufacture of refillable polyester beverage bottles are described in U.S. Pat. No. 4,334,627 to Krishnakumar et al. granted Jun. 15, 1982, U.S. Pat. No. 4,725,464 to Collette granted Feb. 16, 1988, and U.S. Pat. No. 5,066,528 to Krishnakumar et al. granted Nov. 19, 1991, which are hereby incorporated by reference in their entirety.

Expansion of the preform should be carried out at a temperature in the molecular orientation temperature range for the PEN polyester material being employed. Generally speaking, molecular orientation of an orientable thermoplastic material occurs over a temperature range varying from just above the glass transition temperature (that temperature or narrow temperature range below which the polymer is in a glassy state) up to just below the melt temperature of the polymer. As a practical matter, the formation of oriented containers is carried out in a much narrower temperature range, known as the molecular orientation temperature range. The reason is that when the temperature is too close to the glass transition temperature, the material is too stiff to stretch in conventional processing equipment. When the temperature is increased, the processability improves greatly but a practical upper limit is reached at or near the temperature at which large aggregates of crystallites called spherulites begin to form, because the orientation process is adversely affected by spherulite growth. For substantially amorphous polyester material, the molecular orientation range is typically from about 20° to 65° F. (11° to 36° C.), and more preferably about 30° to 40° F. (17° to 22° C.), above the glass transition temperature. Typical amorphous PEN polymer, which has a glass transition temperature of about 255° F. (123° C.), generally has a minimum orientation temperature of about 260° F. (127° C.), and a preferred orientation range of about 270°–295° F. (132°–146° C.).

In the preferred reheat stretch blow process, the hot injected preform is quenched to room temperature before use and then the preform is reheated to within the orientation temperature range before the expansion step. The reheated preform is positioned in a stretch blow assembly wherein a stretch rod is moved into the open end of the preform and extended to draw the preform end against a base of an internal cavity blow mold, thereby axially stretching the preform sidewall, and simultaneously or sequentially a blowing medium is admitted into the interior of the preform through openings in or around the rod to radially stretch the preform outwardly to conform to the inner surface of the mold. The extent of stretching can be varied depending on the desired shape and wall thickness of the blown container and is controlled by affixing the relative dimensions of the initial preform and the finished container.

In an alternative integrated process, the hot injected preform is partially quenched and allowed to equilibriate within the orientation temperature range prior to expansion by a suitable blow or combined stretch/blow apparatus similar to that previously described.

Additional layers or additives may be provided in the multilayer structure for various purposes, such as additional layers of barrier materials (e.g., for moisture, oxygen, carbon dioxide, or light), high thermal stability materials, recycle PET, post-consumer PET, etc. These additional layers may require the use of adhesives between the layers to prevent delamination. Recycled PET may be particularly useful as the core layer, where it is out of contact with the product. Different base structures may be used, such as a footed base having a substantially hemispherical bottom wall with a plurality of downwardly-extending legs terminating in lowermost supporting feet, and with radiating ribs (which are part of the bottom wall) between the legs. The materials, wall thicknesses, preform and bottle contours, and processing techniques may all be varied for a specific end product, while still incorporating the substance of this invention. The container may be for other pressurized or unpressurized beverages, such as beer, juice or milk, or for other non-beverage products.

The benefits of the invention, for example the resistance to hazing and improved stress crack resistance at elevated temperatures, may be particularly suited for a hot-fill container, such as described in U.S. Pat. No. 4,863,046 to Collette et al. granted Sep. 5, 1989, which is hereby incorporated by reference in its entirety. Hot-fill containers typically must withstand elevated temperatures on the order of 180°–185° F. (the product filling temperature) and positive internal pressures on the order of 2–5 psi (the filling line pressure) without substantial deformation (i.e., volume change of no greater than about 1%). The benefits of the invention are particularly suited for a combined refillable and hot-fillable container.

As a further example, the use of low-level PEN copolymers or blends in the exteriors layers (i.e., up to 10% by weight PEN) may provide a 5° C. increase in use temperature (i.e., increase in caustic wash temperature from 60° to 65° C., or increase in hot fill temperature from 83° to 88° C.), while providing a "high value" in terms of increased performance vs cost.

Thus, although several embodiments of this invention have been specifically illustrated and described herein, it is to be understood that variations may be made in the materials, the preform construction, the container constructions and the methods of forming the preform and container without departing from the spirit and scope of the invention as defined by the appended claims.

What is claimed is:

1. A method of forming a container having a substantially transparent multilayer sidewall comprising;

forming at an elevated temperature a preform having a substantially amorphous and transparent multilayer sidewall-forming portion including first and third layers of a first polymeric material and a second core layer between the first and third layers of a second polymeric material;

wherein the first polymeric material comprises on the order of 80–100% PEN and 0–20% PET by total weight of the layer, and the second polymeric material is a substantially nonstrain-crystallizable polyester which remains substantially transparent when stretched within an orientation temperature range of the first polymeric material;

cooling below the glass transition temperature of the first polymeric material and then reheating the preform within the orientation temperature range of the first polymeric material, wherein the preform is reheated from the exterior such that heat is transferred across the core layer; and expanding the sidewall-forming portion within the orientation temperature range of the first polymeric material to form a container having a substantially transparent multilayer sidewall with strain-crysttallized layers of the first polymeric material.

2. The method of claim 1, wherein the second polymeric material is a) PETG; or b) a copolymer or blend of PEN and PETG.

3. The method of claim 1, wherein the second polymeric material is a copolymer or blend of PEN and PET copolymer, and the PET copolymer comprises on the order of up to 10% copolymer.

4. The method of claim 2, wherein the first polymeric material comprises on the order of 90% PEN and 10% PET, the second polymeric material comprises PETG, and the thickness ratio of the first:second:third layers is on the order of 25:50:25.

5. The method of claim 1, wherein the first polymeric material comprises on the order of 1–20% PEN and 80–99% PETG, and the second polymeric material comprises on the order of 80–100% PEN and 0–20% PET by total weight of the layer.

6. The method of claim 1, wherein the first polymeric material comprises on the order of 1–20% PEN and 80–99% PETG, and the second polymeric material comprises on the order of 20–80% PEN and 20–80% PET by total weight of the layer.

7. The method of claim 1, wherein the first polymeric material comprises on the order of 80–100% PEN and 0–20% PET by total weight of the layer, and the second polymeric material comprises on the order of 80–100% PEN and 0–20% PET copolymer by total weight of the layer, where the PET copolymer comprises on the order of up to 10% copolymer.

8. The method of claim 1, wherein the reheating and expanding is performed at an orientation temperature which is on the order of 11° to 36° C. above the glass transition temperature of the first polymeric material.

9. The method of claim 8, wherein the reheating and expanding is performed at an orientation temperature which is on the order of 17° to 22° C. above the glass transition temperature of the first polymeric material.

10. The method of claim 9, wherein the sidewall includes a panel portion which is expanded at a planar stretch ratio of at least 12:1.

11. The method of claim 10, wherein the panel portion is expanded at a planar stretch ratio of at least 15:1.

12. The method of claim 11, wherein the sidewall has a panel portion having an average strain-induced crystallinity of at least 15% in the first and third layers.

13. The method of claim 12, wherein the panel portions has an average strain-induced crystallinity of at least 20% in the first end-third layers.

14. The method of claim 1, wherein the first polymeric material has no greater than 10% by weight of isophthalic acid.

15. The method of claim 1, wherein the first polymeric material is a blend of PEN and PET.

16. The method of claim 1, wherein the first polymeric material is a copolymer of PEN and PET.

17. The method of claim 1, wherein the second polymeric material is selected from the group consisting of: (a) a PET copolymer with 30% cyclohexane dimethanol (PETG); (b) a copolymer or blend of PEN and PETG; and (c) a copolymer or blend of PEN and PET.

18. The method of claim 1, wherein the core layer comprises about 50% of the sidewall thickness.

19. The method of claim 1, wherein the sidewall has a panel portion having a wall thickness of 0.5 to 0.8 mm.

20. The method of claim 1, wherein the level of crystallinity in the sidewall is further enhanced by thermal-induced crystallinity.

21. The method of claim 1, wherein the sidewall further includes one or more layers of barrier materials, high thermal stability materials, recycled PET, or post-consumer PET.

22. The method of claim 1, wherein the article is a container able to withstand at least 20 refill cycles at a caustic wash temperature of 60° C. without crack failure and with a maximum total volume change of +1.5%.

23. The method of claim 1, wherein the article is a freestanding pressurized beverage container.

24. The method of claim 1, wherein the article is a hot-fill container.

25. A method of forming a container having a substantially transparent multilayer sidewall comprising;

forming at an elevated temperature a preform having a substantially amorphous and transparent multilayer sidewall-forming portion including first and third layers of a first polymeric material and a second core layer between the first and third layers of a second polymeric material;

wherein the first polymeric material comprises on the order 80–100% PEN and and 0–20% PET by total weight of the layer, and the second polymeric material is substantially nonstrain-crystallizable polyester which remains substantially transparent when stretched within an orientation, temperature range of the first polymeric material;

cooling below the glass transition temperature of the first polymeric material and then reheating the preform from the exterior such that heat is transferred across the core layer, wherein the reheating and expanding is performed at an orientation temperature which is on the order of 11° to 36° C. above the glass transition temperature of the first polymeric material; and expanding the sidewall-forming portion within the orientation temperature range of the first polymeric material to form a container having a substantially transparent multilayer sidewall with strain-crystallized layers of the first polymeric material.

26. A method of forming a container having a substantially transparent multilayer sidewall, including forming at an elevated temperature a preform having a substantially amorphous and transparent multilayer sidewall-forming portion including a first layer of a first polymeric material and a second layer of a second polymeric material, cooling and then reheating and expanding the preform to form the container, characterized in that:

the first polymeric material is a copolymer or blend which is substantially non-crystallizable and contains both polyethylene naphthalate (PEN) and polyethylene terephthalate (PET), and the second polymeric material is strain-hardened and remains substantially transparent when stretched at a temperature within the orientation temperature range of the first polymeric material;

cooling is performed below the glass transition temperature of the first polymeric material and then reheating of the first and second layers is performed within the orientation temperature range of the first polymeric material which is on the order of 11° to 36° C. above the glass transition temperature of the first polymeric material; and expanding of the preform is performed within the orientation temperature range of the first polymeric material to form a container having a substantially transparent multilayer sidewall with a substantially amorphous first polymeric material layer and a strain-hardened second polymeric material layer.

27. The method of claim 26, further including a third layer of the first polymeric material and wherein the second layer is a core layer between the first and third layers and the preform is reheated from the exterior such that heat is transferred across the core layer.

28. The method of any one of claims 26 and 27, wherein the first polymeric material comprises on the order of 20–80% PEN and 80–20% PET.

29. The method of claim 28, wherein the second polymeric material is a PET copolymer, and the PET copolymer comprises on the order of up to 10% copolymer.

30. The method of claim 28, wherein the sidewall includes a panel portion which is expanded at a planar stretch ratio of at least 12:1.

31. The method of claim 28, wherein the panel portion is expanded at a planar stretch ratio of at least 15:1.

32. The method of claim 31, wherein the panel portion is expanded at a planar stretch ratio of 15–20:1.

33. The method of any one of claim 28, wherein the panel portion has an average strain-induced crystallinity of at least 15% in the second layer.

34. The method of claim 33, wherein the panel portion has an average strain-induced crystallinity of 15–25% in the second layer.

35. The method of claim 28, wherein the first polymeric material is on the order of 50% PEN and 50% PET by total weight of the-layer.

36. The method of claim 28, wherein the sidewall has a panel portion having a wall thickness of 0.5 to 0.8 mm.

37. The method of claim 28, wherein the thickness ratio of the first:second:third layers is on the order of 30:40:30.

38. The method of claim 28, wherein the thickness ratio of the first:second:third layers is on the order of 15:70:15.

39. The method of claim 28, wherein the sidewall further includes one or more layers of barrier materials, high thermal stability materials, recycled PET, or post-consumer PET.

40. The method of claim 28, wherein the orientation temperature range is on the order of 17° to 22° C. above the glass transition temperature of the first polymeric material.

* * * * *

UNITED STATES PATENT AND TRADEMARK OFFICE
CERTIFICATE OF CORRECTION

PATENT NO. : 5,628,957
DATED : May 13, 1997
INVENTOR(S) : Collette et al.

It is certified that error appears in the above-identified patent and that said Letters Patent is hereby corrected as shown below:

Col. 2, line 6 — delete "CHDMZ" and substitute -- CHDM --

Col. 7, line 41 — delete "ratio is" and substitute -- ratios --

Col. 8, line 37 — delete "corze" and substitute -- core --

Col. 12, line 32 — claim 13 should read as follows:

--The method of claim 12, wherein the panel portion has an average strain-induced crystallinity of at least 20% in the first and third layers. --

Signed and Sealed this

Seventeenth Day of November, 1998

Attest:

BRUCE LEHMAN

Attesting Officer          Commissioner of Patents and Trademarks